United States Patent
Miyazawa et al.

(10) Patent No.: US 11,225,009 B2
(45) Date of Patent: Jan. 18, 2022

(54) MANUFACTURING DEVICE FOR MULTIPLE-CHAMBER CONTAINER AND METHOD THEREFOR

(71) Applicant: NISSEI ASB MACHINE CO., LTD., Komoro (JP)

(72) Inventors: Yoshiki Miyazawa, Komoro (JP); Junji Takahashi, Komoro (JP); Kaoru Kasakawa, Osaka (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 435 days.

(21) Appl. No.: 15/764,457

(22) PCT Filed: Sep. 20, 2016

(86) PCT No.: PCT/JP2016/077733
§ 371 (c)(1),
(2) Date: Mar. 29, 2018

(87) PCT Pub. No.: WO2017/057108
PCT Pub. Date: Apr. 6, 2017

(65) Prior Publication Data
US 2018/0319067 A1 Nov. 8, 2018

(30) Foreign Application Priority Data
Sep. 29, 2015 (JP) .............................. JP2015-191100

(51) Int. Cl.
*B29C 49/06* (2006.01)
*B65D 1/00* (2006.01)
(Continued)

(52) U.S. Cl.
CPC .......... *B29C 49/062* (2013.01); *B29C 49/185* (2013.01); *B65D 1/00* (2013.01);
(Continued)

(58) Field of Classification Search
CPC ..... B29C 49/062; B29C 49/185; B29C 49/06; B29C 49/18; B29C 49/36; B65D 1/00;
(Continued)

(56) References Cited

U.S. PATENT DOCUMENTS 5,482,170 A 1/1996 Semersky et al.
5,849,241 A 12/1998 Connan
(Continued)

FOREIGN PATENT DOCUMENTS

CN A-101801640 8/2010
CN A-102773997 11/2012
(Continued)

OTHER PUBLICATIONS

Machine English Translation of JP 2005088904 (Year: 2005).*
(Continued)

*Primary Examiner* — Timothy Kennedy
*Assistant Examiner* — Olukorede Esan
(74) *Attorney, Agent, or Firm* — Greenblum & Bernstein, P.L.C.

(57) ABSTRACT

A manufacturing device of the present invention includes an intermediate molded body mold having a first accommodating space capable of accommodating a plurality of preforms, each preform having a mouth portion and a trunk portion; an intermediate molded body blowing unit configured to blow gas into the plurality of preforms arranged in the first accommodating space to inflate the plurality of preforms, thereby manufacturing an intermediate molded body having a connection portion formed by the trunk portions of the plurality of preforms welded to each other; a final molded body mold having a second accommodating space larger than the first accommodating space; and a final molded body blowing unit configured to blow gas into the intermediate molded body arranged in the second accommodating space
(Continued)

to inflate the intermediate molded body, thereby forming an exterior shape of a multiple-chamber container.

5 Claims, 6 Drawing Sheets

(51) Int. Cl.
    *B29C 49/18*     (2006.01)
    *B65D 1/04*     (2006.01)
    *B29C 49/36*     (2006.01)
    *B29L 31/00*     (2006.01)
    *B65D 1/02*     (2006.01)

(52) U.S. Cl.
    CPC ............... *B65D 1/04* (2013.01); *B29C 49/06* (2013.01); *B29C 49/18* (2013.01); *B29C 49/36* (2013.01); *B29L 2031/7158* (2013.01); *B65D 1/0223* (2013.01)

(58) Field of Classification Search
    CPC .. B65D 1/04; B65D 1/0223; B29L 2031/7158
    See application file for complete search history.

(56) References Cited

U.S. PATENT DOCUMENTS

| | | | |
|---|---|---|---|
| 6,984,119 B1 * | 1/2006 | Hickman | ............ B29C 49/0073 425/503 |
| 2010/0209634 A1 | 8/2010 | Kim et al. | |
| 2012/0294974 A1 * | 11/2012 | Yokobayashi | ...... B29C 49/4215 425/541 |
| 2014/0305074 A1 | 10/2014 | Halbherr et al. | |
| 2014/0367895 A1 | 12/2014 | Sato et al. | |

FOREIGN PATENT DOCUMENTS

| | | | |
|---|---|---|---|
| CN | A-103596742 | | 2/2014 |
| JP | 9-169327 A | | 6/1997 |
| JP | 2568993 | | 1/1998 |
| JP | 2005088904 | * | 4/2005 ............... B65D 1/00 |
| JP | 2013-180785 | | 9/2013 |

OTHER PUBLICATIONS

English Translation of JP 2013180785A (Year: 2013).*
Notification of First Office Action issued by the Chinese Patent Office in corresponding Chinese Application No. 201680056735.3, dated Jul. 2, 2019.
International Search Report issued by the Japan Patent Office in corresponding International Application No. PCT/JP2016/077733, dated Oct. 18, 2016.
Supplementary European Search Report issued in counterpart European Application No. 16851282.0, dated Apr. 15, 2019.

* cited by examiner

MANUFACTURING DEVICE FOR MULTIPLE-CHAMBER CONTAINER AND METHOD THEREFOR

This application is a national phase of International Application No. PCT/JP2016/077733, titled "Manufacturing Device For Multiple-Chamber Container And Method Therefor", filed on Sep. 20, 2016, which claims the benefit of priority to Japanese Patent Application No. 2015-191100, filed in the Japan Patent Office on Sep. 29, 2015, the entire content of which are incorporated herein by reference.

TECHNICAL FIELD

The present invention relates to a manufacturing device for a multiple-chamber container and a manufacturing method of the same.

BACKGROUND ART

Conventionally, multiple-chamber containers having a plurality of chambers which can individually accommodate, for example, different kinds of contents, are known. As methods for manufacturing a multiple-chamber container, for example, a method for manufacturing one multiple-chamber container by manufacturing two preforms by injection molding, transferring the two preforms to a mold, blowing air into each of the preforms and then bonding and connecting inflated trunk portions of the preforms to each other is known.

In the above method, when the trunk portions of the preforms are directly bonded to each other, the trunk portions must be maintained in a molten state at a high temperature and also must be welded to each other at the same time as inflating the preforms. However, since no means for supporting the welded surfaces is provided in the mold, there is a case where a shape of a connection portion including the welded surfaces is curved into various shapes different from that as designed and thus a shape of a partition wall delimiting chambers of the multiple-chamber container collapses. Thus, for example, a manufacturing method of Patent Document 1 has been proposed.

CITATION LIST

Patent Document

Patent Document 1: Japanese Utility Model Registration No. 2568993

SUMMARY OF INVENTION

Problems to Be Solved

In the manufacturing method described in Patent Document 1, blow molding is performed in a state where a partition member is inserted between the preforms. Since the partition member is interposed therebetween until blow molding is ended, trunk portions of the preforms are welded to each other only at supporting projection portions. Therefore, a welded area of the preforms is reduced and thus a multiple-chamber container manufactured by the manufacturing method tends to be separated due to a weak bonding strength of a connection portion thereof.

Accordingly, an object of the present invention is to provide a manufacturing device for a multiple-chamber container and a manufacturing method therefor, in which it is possible to prevent a connection portion of the multiple-chamber container from having a shape different from a shape as designed and also to enhance a bonding strength of the connection portion.

Means for Solving the Problems

In order to achieve the above object, a manufacturing device for a multiple-chamber container of the present invention includes:

a first mold having a first accommodating space capable of accommodating a plurality of preforms, each preform having a mouth portion and a trunk portion;

a first blowing unit configured to blow gas into the plurality of preforms arranged in the first accommodating space to inflate the plurality of preforms, thereby manufacturing an intermediate molded body having a connection portion formed by the trunk portions of the plurality of preforms welded to each other;

a second mold having a second accommodating space larger than the first accommodating space; and a second blowing unit configured to blow gas into the intermediate molded body arranged in the second accommodating space to inflate the intermediate molded body, thereby forming an exterior shape of the multiple-chamber container.

According to this configuration, the first mold has the first accommodating space smaller than the second accommodating space of the second mold for defining the exterior shape of the multiple-chamber container. The first blowing unit inflates the preforms in the first accommodating space smaller than the exterior shape of the multiple-chamber container so that the trunk portions of the preforms are welded to each other, thereby manufacturing the intermediate molded body including the connection portion. In the first accommodating space smaller than the exterior shape of the multiple-chamber container, a space, which allows a shape of the connection portion including the welded surfaces to be freely deformed when each of the preforms is inflated, is small. Therefore, it is possible to prevent the connection portion connecting the inflated trunk portions with each other from being formed in various shapes different from that as designed. Also, the trunk portions are directly welded to each other without a partition member or the like interposed therebetween, thereby forming the connection portion. As a result, the welded area is increased and thus a bonding strength of the connection portion is increased. The connection portion formed as described above is difficult to be deformed and also the bonding strength can be maintained, even while blowing is performed by the second blowing unit. Therefore, according to the above configuration, it is possible to prevent the connection portion of the multiple-chamber container from having a shape different from a shape as designed and also to enhance the bonding strength of the connection portion.

Also, in the manufacturing device for the multiple-chamber container of the present invention, a projection configured to form an exterior shape of the connection portion may be formed on an inner wall surface of the first mold which is configured to form an exterior shape of the intermediate molded body.

According to this configuration, the space, which allows the shape of the connection portion to be freely deformed when each of the preforms is inflated in the first accommodating space, is further reduced due to the projection formed on the inner wall surface. Therefore, the connection portion connecting the inflated trunk portions to each other is further prevented from being formed in various shapes different from that as designed.

Further, in the manufacturing device for the multiple-chamber container of the present invention, a distal end of the projection may include a flat surface.

According to this configuration, when the preforms are being inflated, it is possible to prevent scratches from being generated on the connection portion even if the inflated portions and the distal end surface of the projection come in contact with each other.

Further, the manufacturing device for the multiple-chamber container of the present invention may further include:

a preform manufacturing unit configured to manufacture the preforms by injection molding; and an ejecting unit configured to eject the multiple-chamber container manufactured by the second blowing unit to an outside of the device.

According to this configuration, steps for manufacturing the multiple-chamber container can be performed by one manufacturing device, thereby enhancing the efficiency in manufacturing the multiple-chamber container.

Also, in the manufacturing device for the multiple-chamber container of the present invention, the first blowing unit may include a temperature adjusting portion configured to adjust a temperature of the intermediate molded body to a temperature at which resin can be easily inflated.

According to this configuration, a step of manufacturing the intermediate molded body and a step of adjusting a temperature thereof can be concurrently performed, thereby enhancing the manufacturing efficiency.

Further, a manufacturing method of a multiple-chamber container of the present invention is a method for manufacturing a multiple-chamber container using a first mold having a first accommodating space and a second mold having a second accommodating space larger than the first accommodating space, the method including:

a first step of preparing a plurality of preforms, each preform being made of resin and having a mouth portion and a trunk portion;

a second step of manufacturing an intermediate molded body having a connection portion formed by the trunk portions of the plurality of preforms welded to each other by arranging the plurality of preforms in the first accommodating space and then blowing gas into the plurality of preforms to inflate the plurality of preforms; and a third step of forming an exterior shape of the multiple-chamber container by arranging the intermediate molded body in the second accommodating space and then blowing gas into the intermediate molded body to inflate the intermediate molded body.

According to this process, the first mold has the first accommodating space smaller than the second accommodating space of the second mold which is configured to form the exterior shape of the multiple-chamber container. The preforms are inflated in the first accommodating space smaller than the exterior shape of the multiple-chamber container by using the first mold, so that the trunk portions of the preforms are welded to each other and thus the connection portion is formed. In the first accommodating space smaller than the exterior shape of the multiple-chamber container, a space, which allows a shape of the connection portion including the welded surfaces to be freely deformed when each of the preforms is inflated, is small. Therefore, it is possible to prevent the connection portion connecting the trunk portions with each other from being formed in various shapes different from that as designed. Also, the trunk portions are directly welded to each other without a partition member or the like interposed therebetween, thereby forming the connection portion. As a result, the welded area is increased and thus a bonding strength of the connection portion is increased. The connection portion formed as described above is difficult to be deformed and also the bonding strength can be maintained, even while blowing is performed to form the exterior shape of the multiple-chamber container. Therefore, according to the above process, it is possible to prevent the connection portion of the multiple-chamber container from having a shape different from a shape as designed and also to enhance the bonding strength of the connection portion.

Further, a method of manufacturing an intermediate molded body of the present invention includes:

a first step of preparing a plurality of preforms, each preform being made of resin and having a mouth portion and a trunk portion; and a second step of manufacturing an intermediate molded body having a connection portion formed by the trunk portions of the plurality of preforms welded to each other by using a mold having an accommodating space smaller than an exterior shape of a multiple-chamber container and blowing gas into the plurality of preforms arranged in the accommodating space to inflate the plurality of preforms.

According to this process, the preforms are inflated in the accommodating space smaller than the exterior shape of the multiple-chamber container, so that the trunk portions of the preforms are welded to each other and thus the connection portion is formed. In the accommodating space smaller than the exterior shape of the multiple-chamber container, a space, which allows a shape of the connection portion including the welded surfaces to be freely deformed when each of the preforms is inflated, is small. Therefore, it is possible to prevent the connection portion connecting the trunk portions with each other from being formed in various shapes different from that as designed. Also, the trunk portions are directly welded to each other without a partition member or the like interposed therebetween, thereby forming the connection portion. As a result, the welded area is increased and thus a bonding strength of the connection portion is increased. Therefore, according to the above process, it is possible to prevent the connection portion of the intermediate molded body from having a shape different from a shape as designed and also to enhance the bonding strength of the connection portion.

Advantageous Effects of Invention

According to the manufacturing device for the multiple-chamber container and the manufacturing method therefor of the present invention, it is possible to prevent the connection portion of the multiple-chamber container from having a shape different from a shape as designed and also to enhance the bonding strength of the connection portion.

Figure 2:
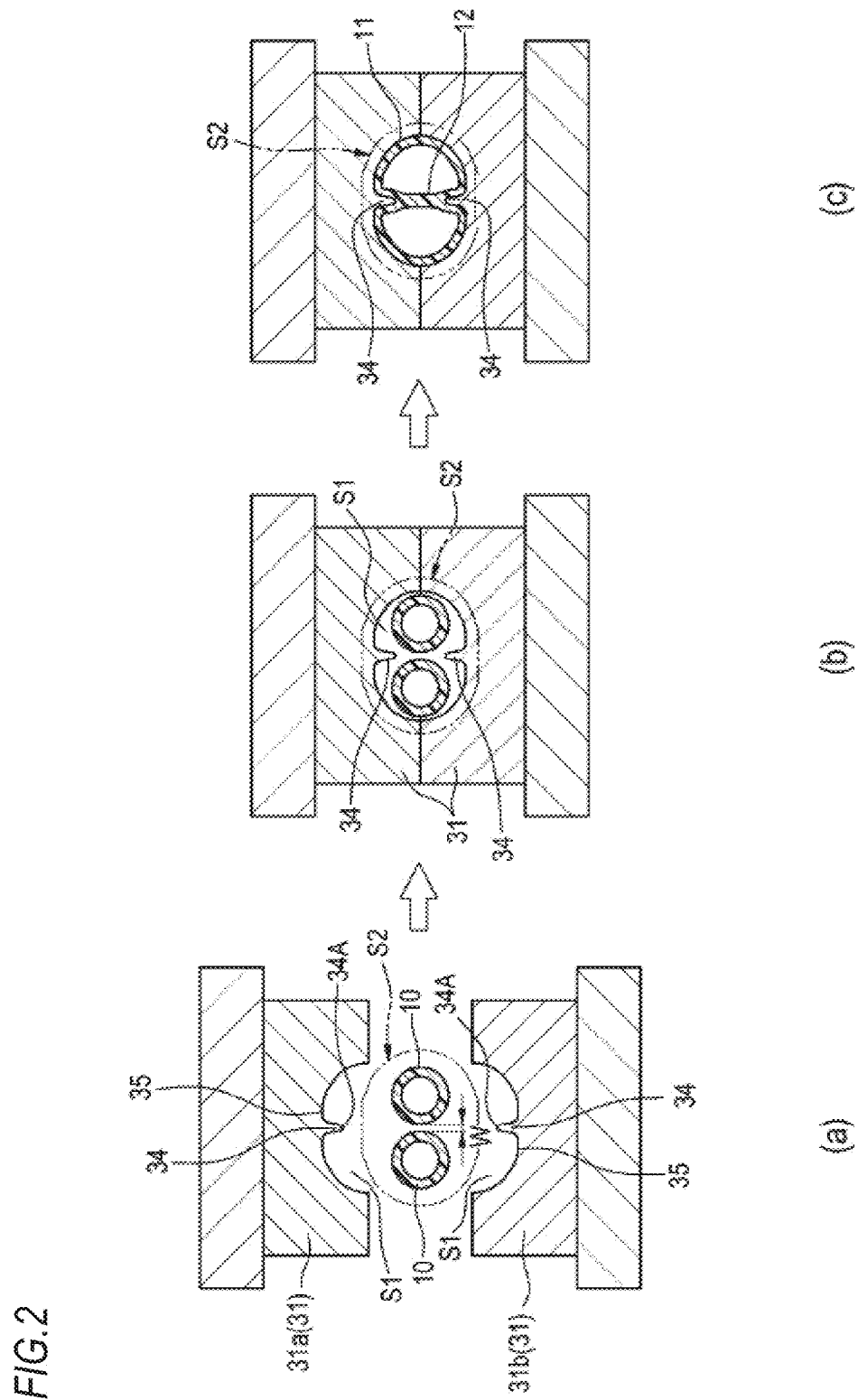

(a) to (c) of FIG. 2 are cross-sectional views showing a manufacturing part for manufacturing an intermediate molded body.

Figure 3:
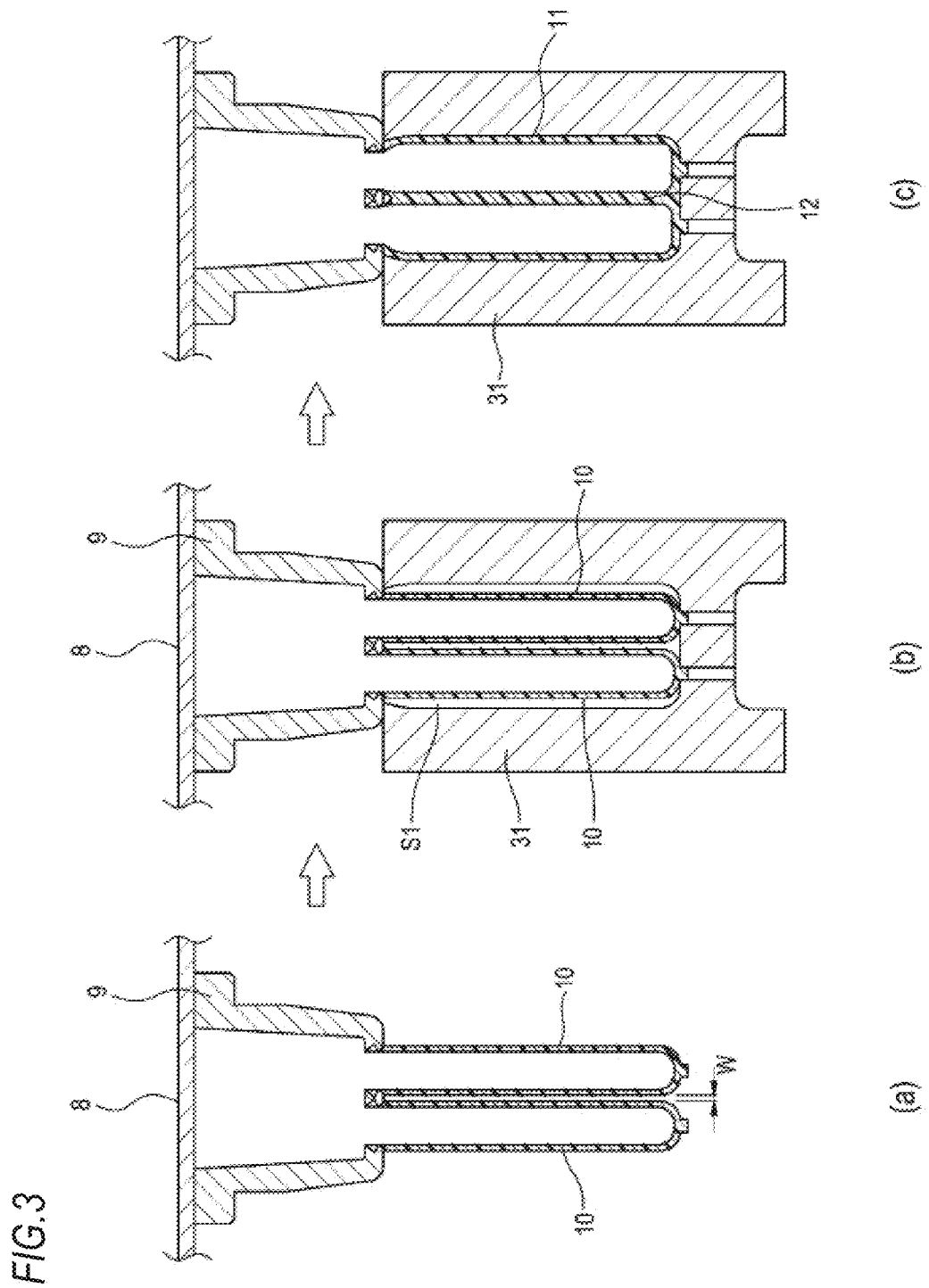

(a) to (c) of FIG. 3 are longitudinal-sectional views showing the manufacturing part for manufacturing the intermediate molded body.

Figure 4:
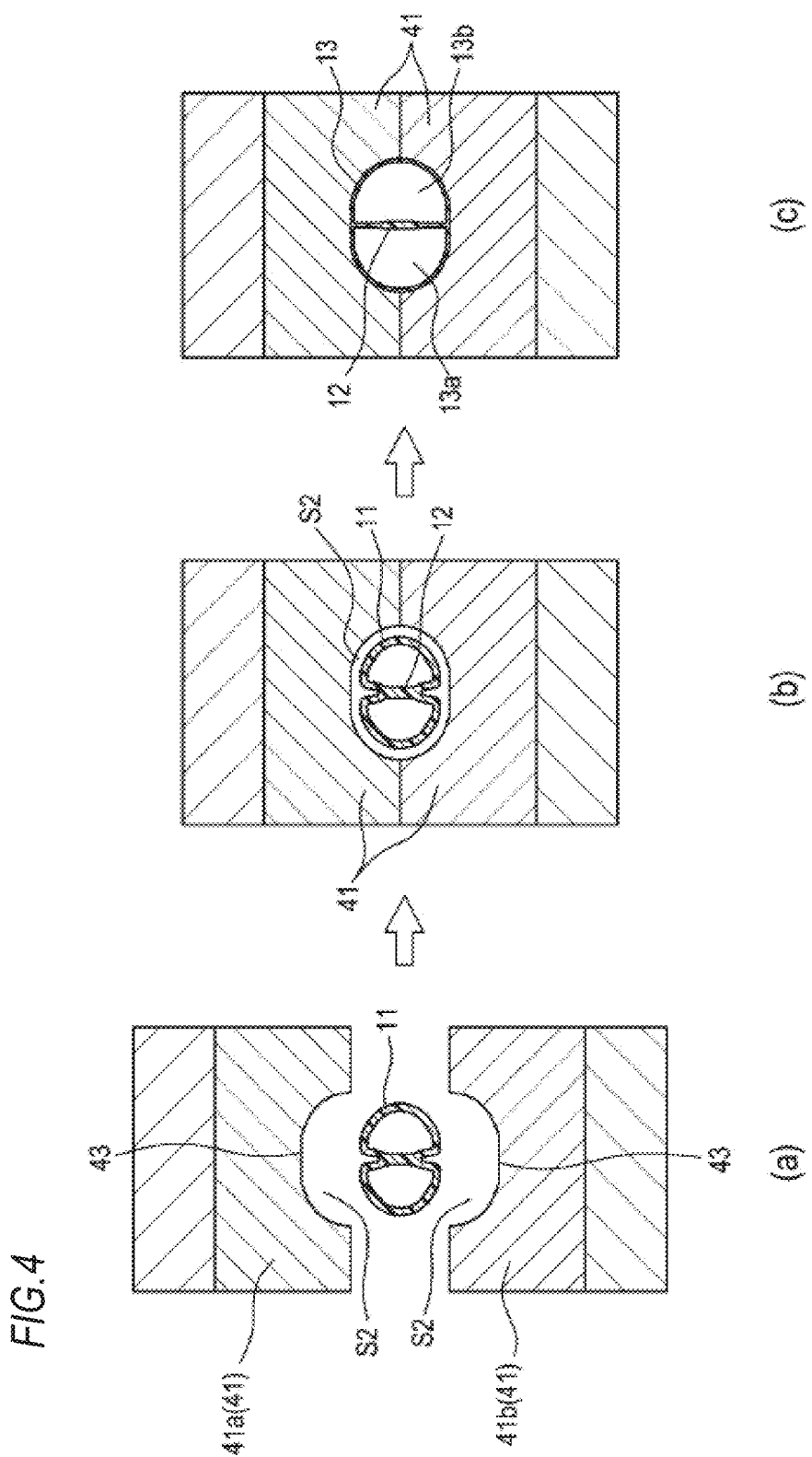

(a) to (c) of FIG. 4 are cross-sectional views showing a manufacturing part for manufacturing a final molded body.

Figure 5:
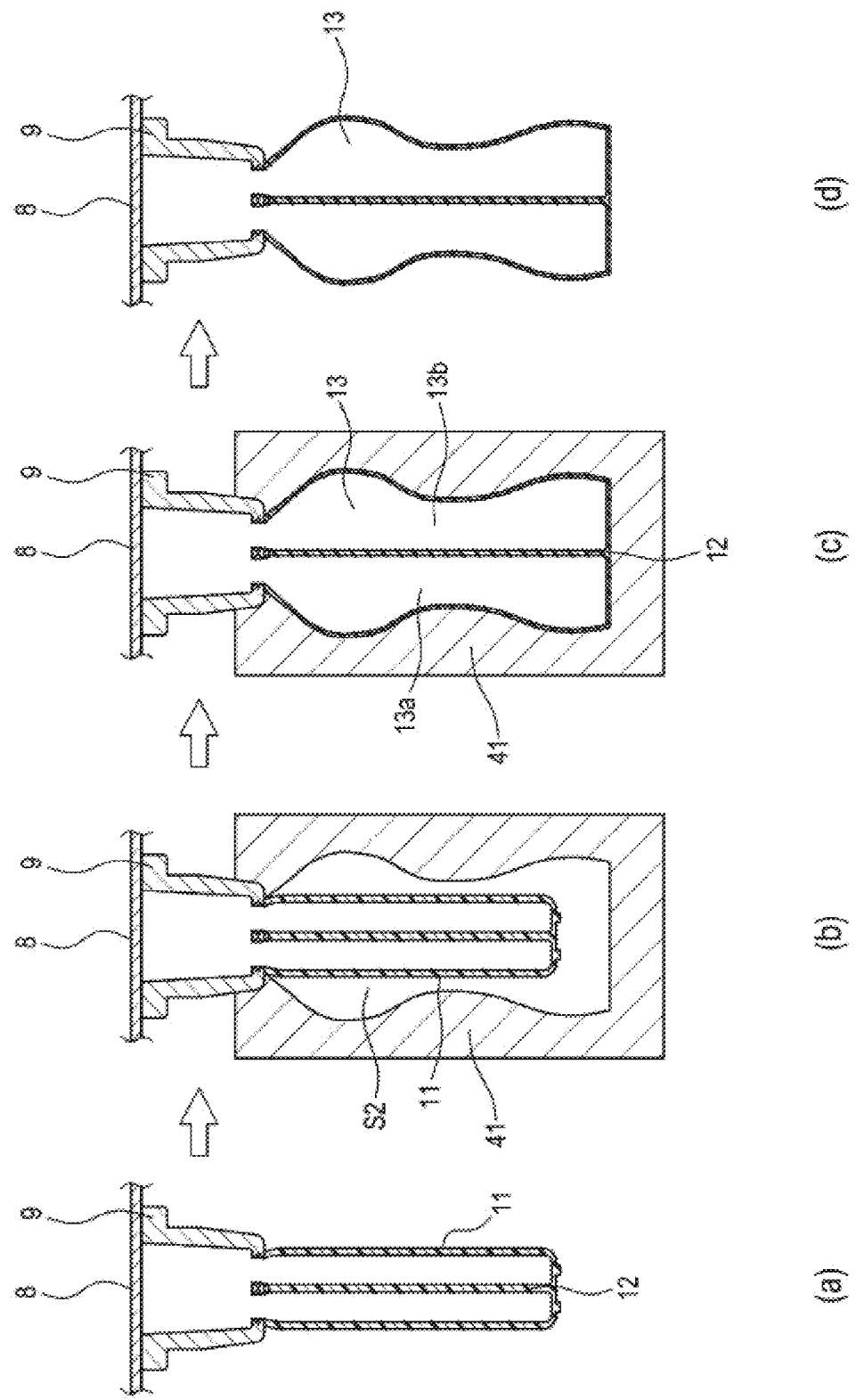

(a) to (d) of FIG. 5 are longitudinal-sectional views showing the manufacturing part for manufacturing the final molded body.

Figure 6:
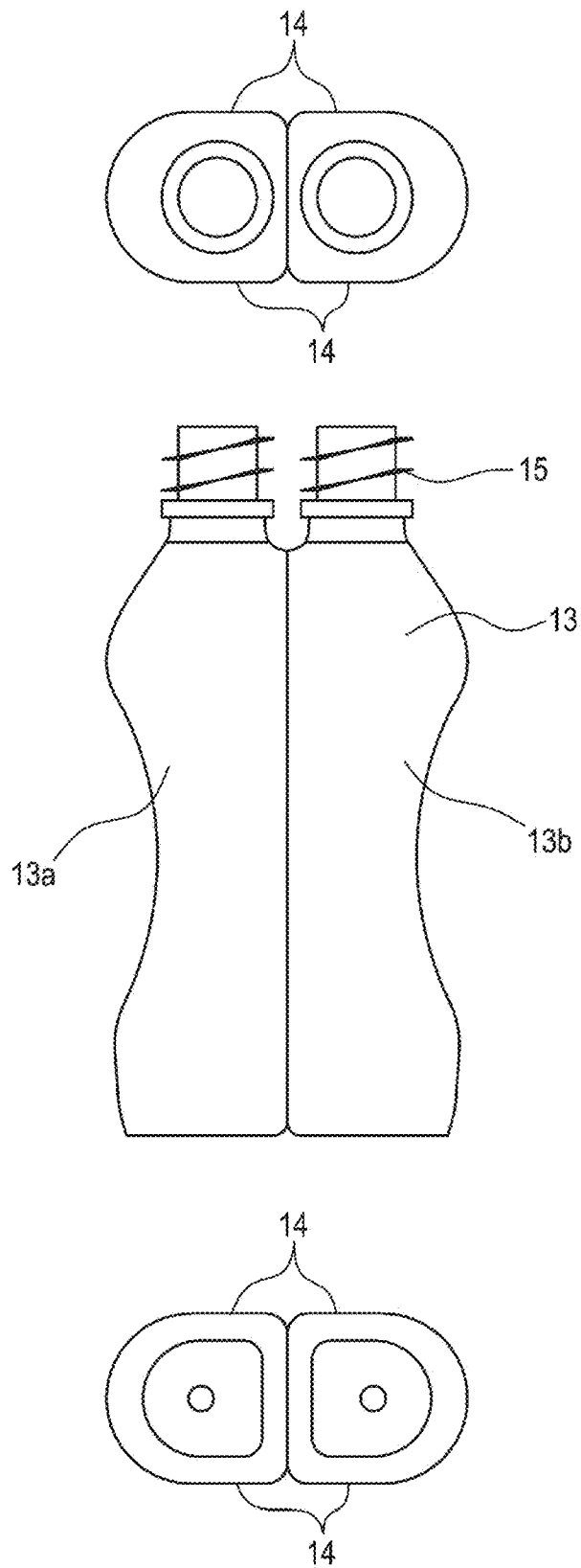

FIG. 6 is a view showing an example of the multiple-chamber container.

DETAILED DESCRIPTION OF PREFERRED EMBODIMENTS

Hereinafter, examples of the present embodiment will be described in detail with reference to the accompanying drawings.

Figure 1:
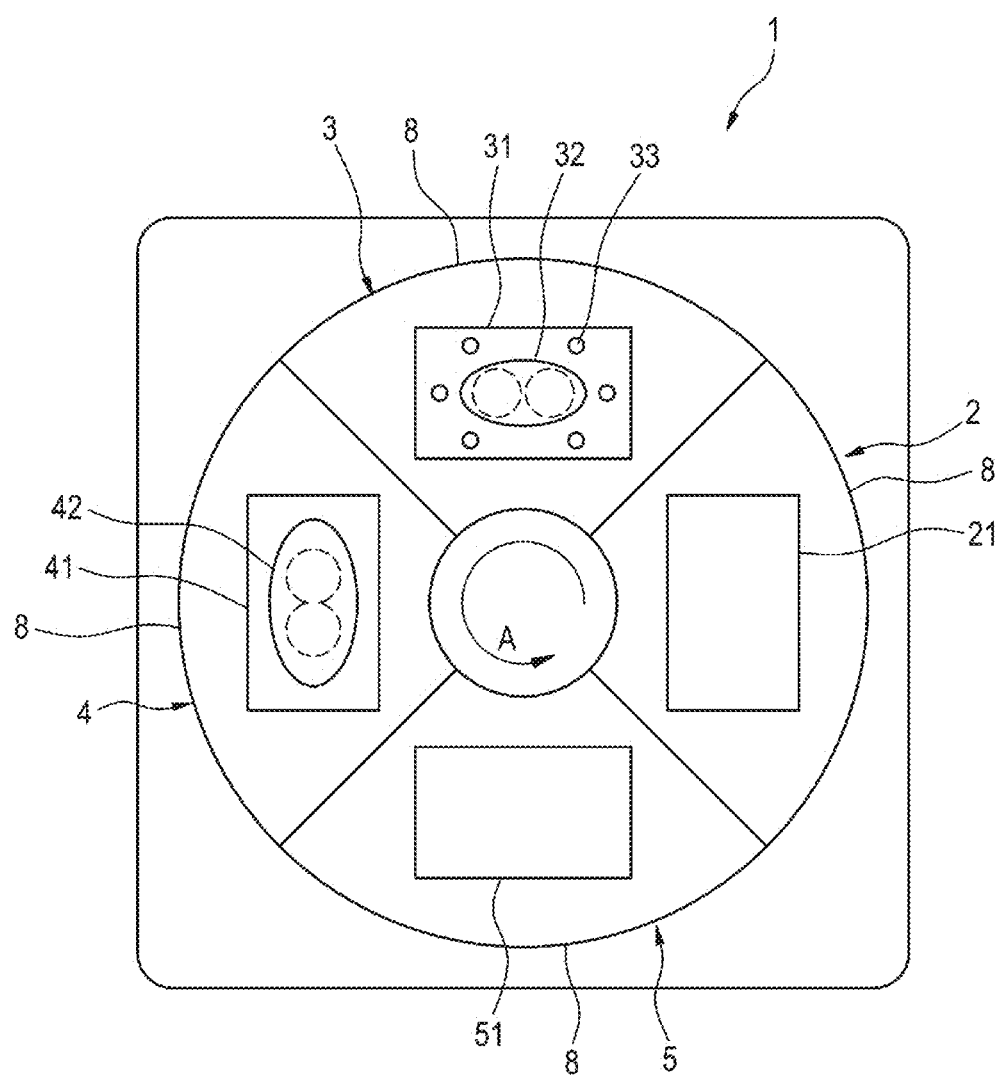
FIG. 1 is a view showing a schematic configuration of a manufacturing device for a multiple-chamber container according to an embodiment of the present invention.

As shown in FIG. 1, a manufacturing device (manufacturing apparatus) 1 for a multiple-chamber container is configured as a molding machine of a rotary conveyance type, in which a conveyance region extending over 360 degrees is divided into four regions. The manufacturing device 1 for the multiple-chamber container has a preform manufacturing part 2, an intermediate molded body manufacturing part (intermediate molded article manufacturing part) 3, a final molded body manufacturing part (final molded article manufacturing part) 4 and a take-out part 5 in the four divided regions, respectively. In a conveying direction (a direction of an arrow A), the intermediate molded body manufacturing part 3 is arranged downstream of the preform manufacturing part 2, the final molded body manufacturing part 4 is arranged downstream of the intermediate molded body manufacturing part 3, and the take-out part 5 is arranged downstream of the final molded body manufacturing part 4. Each of parts 2 to 5 is provided with a transfer plate 8 configured to be intermittently rotated and conveyed.

The preform manufacturing part 2 is provided with a preform manufacturing unit 21 for manufacturing a plurality of (in the present example, two) preforms by injection molding. The preform manufacturing unit 21 is constituted of an injection mold (not shown), including an outer mold, a core and the like, a mouth mold supported on the transfer plate 8 or the like. The preform manufacturing unit 21 is configured to manufacture a preform made of PET (Polyethyleneterephthalate) and including a bottomed barrel-shaped trunk portion (bottomed barrel-shaped body portion) and a mouth portion formed on an opening side of the trunk portion.

The intermediate molded body manufacturing part 3 is provided with an intermediate molded body mold (intermediate molded article mold, an example of the first mold) 31, an intermediate molded body blowing unit (intermediate molded blowing unit, an example of the first blowing unit) 32 and the like.

The intermediate molded body mold 31 has a first accommodating space capable of accommodating a plurality of (in the present example, two) preforms. An inner wall surface of the intermediate molded body mold 31 forms an exterior shape of an intermediate molded body and also defines the first accommodating space. The intermediate molded body blowing unit 32 is configured to manufacture an intermediate molded body (intermediate molded article) by blow-molding preforms. The intermediate molded body blowing unit 32 has a temperature adjusting portion 33 capable of adjusting a temperature of an intermediate molded body and configured, for example, by an annular heater, an infrared heater or the like.

The final molded body manufacturing part (final molded article manufacturing part) 4 is provided with a final molded body mold (final molded article mold, an example of the second mold) 41, a final molded body blowing unit (final molded article blowing unit, an example of the second blowing unit) 42 and the like.

The final molded body mold 41 has a second accommodating space capable of accommodating an intermediate molded body. The second accommodating space has a volume larger than the first accommodating space of the intermediate molded body mold 31. An inner wall surface of the final molded body mold 41 forms an exterior shape of a multiple-chamber container and also defines the second accommodating space. The final molded body blowing unit 42 is configured to manufacture a final molded body (final molded article) having the exterior shape of the multiple-chamber container by blow-molding an intermediate molded body.

The take-out part 5 is provided with an ejecting unit 51 for ejecting the manufactured final molded body to an outside of the manufacturing device 1. The ejecting unit 51 is configured to eject the final molded body by opening the mouth mold configured by a pair of split molds.

The intermediate molded body manufacturing part 3 will be further described with reference to FIGS. 2 and 3.

The first accommodating space S1 of the intermediate molded body mold 31 is configured to accommodate two preforms 10 in the present example and is defined by clamping a pair of intermediate molded body split molds 31a, 31b together. For comparison, the second accommodating space S2 formed in the final molded body mold 41 is shown by a broken line in FIG. 2. The first accommodating space S1 of the intermediate molded body mold 31 is formed to be smaller than the second accommodating space S2 of the final molded body mold 41.

The intermediate molded body blowing unit 32 is configured by a mouth mold 9 supported on a transfer plate 8 and configured to hold mouth portions of preforms 10, a blowing member (not shown) configured to be inserted into the preforms 10 through the mouth mold 9 in order to blow air (an example of the gas) into the preforms 10, and the like. The intermediate molded body blowing unit 32 (see FIG. 1) is configured to manufacture an intermediate molded body 11 by blowing air into two preforms 10, which are juxtaposed with each other in the first accommodating space S1, and thus inflating the preforms 10. The manufactured intermediate molded body 11 has a connection portion 12 formed by trunk portions of the two pre forms 10 welded to each other at opposing predetermined circumferential regions thereof. A thickness of the connection portion 12 in a direction, along which the preforms 10 are juxtaposed, is formed to be thicker than a thickness of a wall of a trunk portion of the intermediate molded body 11.

The pair of intermediate molded body split molds 31a, 31b configuring the intermediate molded body mold 31 includes a pair of projections 34 respectively formed at opposing locations on inner wall surfaces thereof defining the first accommodating space S1. The projections 34 are provided to be positioned between the two accommodated preforms 10 in the juxtaposed direction of the two preforms 10. Each of the projections 34 has a width narrower than a minimum space width w between the two accommodated preforms 10. Also, the projection 34 is continuously straightly formed along a length direction of the preforms 10 accommodated in the intermediate molded body mold 31. Further, the projection 34 has a distal end portion 34A formed in a flat surface shape, and also an edge of the distal end portion 34 is machined to be rounded. When air has been blown into the two preforms 34, the distal end portions 34A of the projections 34 abut respectively against both end portions of the connection portion 12 of the blow-molded intermediate molded body 11.

The final molded body manufacturing part 4 will be further described with reference to FIGS. 4 and 5.

The second accommodating space S2 of the final molded body mold 41 is configured to accommodate the intermediate molded body 11 and is defined by clamping a pair of final molded body split molds 41a, 41b together.

The final molded body blowing unit 42 is configured by a mouth mold 9 supported on a transfer plate 8 and configured to hold mouth portions of the intermediate molded body 11, a blowing member (not shown) configured to be inserted into the intermediate molded body 11 through the mouth mold 9 in order to blow air into the intermediate molded body 11, and the like. The final molded body blowing unit 42 (see FIG. 1) is configured to manufacture a final molded body 13 by blowing air into the intermediate molded body 11 arranged in the second accommodating space S2 and thus inflating the intermediate molded body 11. The manufactured final molded body 13 has two accommodating portions 13a, 13b which are chambers separated from each other by a connection portion 12 straightly extending in a length direction (longitudinal direction) thereof. A thickness of the connection portion 12 is formed to be thicker than a thickness of a wall of a trunk portion of the final molded body 13. Also, the inner wall surface of the final molded body mold 41 is formed in a flat surface shape at opposing predetermined regions 43 thereof. The regions 43 correspond to locations of regions 35 formed in the inner wall surface of the intermediate molded body mold 31.

Next, a method for manufacturing a multiple-chamber container using the manufacturing device 1 will be described with reference to FIGS. 1 to 5.

(First Stale (Example of First Step))

In the preform manufacturing unit 21, for example, two test tube-shaped preforms 10 having the same structure are manufactured by injecting a thermoplastic resin (280 to 300° C.) from an injection molding machine into a preform molding mold, which is formed in a bottomed barrel shape by a combination of the injection mold, the mouth mold 9 and the like. When the resin is injected, a temperature of the mold is kept cooled at approximately 15° C. The two manufactured preforms 10 are transferred to the next stage by rotating the transfer plate 8 in a state where the preforms 10 are juxtaposed and mouth portions thereof are held by the mouth mold 9 (see (a) of FIG. 3).

Meanwhile, although the preforms 10 each having an independent structure are employed in the present example, a structure in which, for example, two preforms 10 are connected to each other at mouth portions thereof by a connection piece, which is made of the same resin as that of the preforms, may be employed. Also, preforms, which are previously separately manufactured by a device different from the manufacturing device 1, may be employed.

(Second Stage (Example of Second Step))

In the intermediate molded body blowing unit 32, the two transferred preforms 10 are arranged between the intermediate molded body split molds 31a, 31b in an opened state (see (a) of FIG. 2). Subsequently, the intermediate molded body mold 31 is clamped and then blowing air into the two preforms 10 is started (see (b) of FIG. 2 and (b) of FIG. 3). At this time, a temperature of the preforms 10 is 100 to 120° C. Also, a temperature of the intermediate molded body mold 31 is adjusted to 70 to 100° C. by the temperature adjusting portion 33.

In the two preforms 10 inflated by blowing, circumferential surfaces of the preforms 10 abut against the inner wall surface of the intermediate molded body mold 31 and also opposing trunk portions of the preforms 10 abut against each other. Therefore, the abutted trunk portions are welded to each other, and thus an intermediate molded body 11, in which a connection portion 12 formed by the welding extends in a length direction of the preforms 10, is manufactured (see (c) of FIG. 2 and (c) of FIG. 3). At this time, both end portions of the connection portion 12 abut respectively against the projections 34 formed on the inner wall surface of the intermediate molded body mold 31, thereby forming an exterior shape of the connection portion 12 (see (c) of FIG. 2). A temperature of the manufactured intermediate molded body 11 is maintained at approximately 100° C., at which the resin can be easily inflated, by adjusting the temperature adjusting portion 33.

The manufactured intermediate molded body 11 is removed from the intermediate molded body mold 31 and then is transferred to the next stage by rotating the transfer plate 8 in a state where mouth portions of the intermediate molded body 11 are held by the mouth mold 9 (see (a) of FIG. 5).

(Third Stage (Example of Third Step))

In the final molded body blowing unit 42, the transferred intermediate molded body 11 is arranged between the final molded body split molds 41a, 41b in an opened state (see (a) of FIG. 4). Subsequently, the final molded body mold 41 is clamped and then blowing air into the intermediate molded body 11 is started (see (b) of FIG. 4 and (b) of FIG. 5). At this time, a temperature of the final molded body mold 41 is kept cooled at 20 to 30° C.

The intermediate molded body 11 is gradually inflated by blowing and thus a circumferential surface of the intermediate molded body 11 abuts against the inner wall surface of the final molded body mold 41. Therefore, a final molded body 13 having two accommodating portions 13a, 13b with the connection portion 12 interposed therebetween, that is, an exterior shape of a multiple-chamber container is manufactured (see (c) of FIG. 4 and (c) of FIG. 5). The connection portion 12 straightly extends in a length direction of the final molded body 13, thereby delimiting the accommodating portions 13a, 13b as independent containers.

Meanwhile, when manufacturing the final molded body 13, biaxial stretching blow molding, in which a high pressure air is blown in a circumferential direction (a direction of a transversal axis) and also a stretching rod is used to stretch the intermediate molded body 11 in a length direction (a direction of a longitudinal axis), may be performed.

The manufactured final molded body 13 is removed from the final molded body mold 41 and then is transferred to the next stage by rotating the transfer plate 8 in a state where mouth portions thereof are held by the mouth mold 9 (see (d) of FIG. 5).

(Fourth Stage)

In the ejecting unit 51, the transferred final molded body 13 is released from the mouth mold 9 and then the final molded body 13 is ejected to the outside of the manufacturing device 1.

Due to the first to fourth stages as described above, a multiple-chamber container 13 configured by two accommodating portions 13a, 13b having a symmetric structure as shown in FIG. 6 can be manufactured. In the present example, the multiple-chamber container 13 is configured such that recessed portions at the middle thereof can be squeezed. Also, middle portions 14 of front and rear surface sides of the multiple-chamber container 13 are formed in a flat surface shape. Further, each of the mouth portions of the multiple-chamber container 13 has a screw thread 15 formed to allow a cap to be removed therefrom. Each of accommodating portions 13a, 13b is capable of accommodating, for example, cosmetics, cleanser or the like.

Meanwhile, in a conventional configuration in which, for example, a partition member or the like is provided to define a shape of a connection portion including welded surfaces of preforms as designed when a plurality of preforms are welded to each other, a contact area between the preforms and the partition member is reduced. Therefore, a bonding strength of the welded portion tends to be weak. Also, due to a complicated structure in which the partition member or the like is provided in a mold, the cost of equipment is increased. Here, welding means that, for example, heated preforms are bonded to one another in a deformable state during blow molding, and thus does not require that the entire pre forms are molten into a complete liquid state and then are bonded to one another.

In contrast, according to the manufacturing device and manufacturing method for the multiple-chamber container of the present embodiment, preforms 10 are first blow-molded by using the intermediate molded body mold 31 having the first accommodating space S1 to manufacture an intermediate molded body 11, and then the intermediate molded body 11 is blow-molded by using the final molded body mold 41 having the second accommodating space S2 to manufacture a final molded body 13. Thus, when the intermediate molded body 11 is manufactured, a connection portion 12 is formed by directly welding trunk portions of the preforms 10 to each other. Therefore, it is possible to increase a welded area therebetween and thus to enhance a bonding strength of the connection portion 12. Further, since the partition member is not employed, structures of the molds are not complicated and also the cost of equipment is reduced as compared with the technology in which the partition member is employed.

Also, according to the present embodiment, when comparing sizes of the accommodating spaces of the molds, the first accommodating space S1 is formed to be smaller than the second accommodating space S2. Here, in the present embodiment, assuming that a volume of the first accommodating space S1 is 1, a volume of the second accommodating space S2 is preferably set to be 2.5 or greater, more preferably 2.5 to 10.

If a space of the preforms 10 inflated by blowing is increased, an amount of air to be blown and a time required for blowing are also increased. Therefore, uncertain factors of deforming the welded surfaces of the preforms 10 are increased and thus a possibility that the connection portion 12 is not formed in a shape as designed is increased. In contrast, in the first accommodating space S1 smaller than the exterior shape of the multiple-chamber container, a space, which allows a shape of the connection portion 12 including the welded surfaces of the preforms 10 to be freely deformed when each of the preforms 10 is inflated, is small. Therefore, the connection portion 12 connecting the trunk portions of the preforms 10 to each other can be formed in a shape as designed, for example, in a straight flat surface shape.

Further, on the inner wall surface of the intermediate molded body mold 31 forming the exterior shape of the intermediate molded body 11, the pair of projections 34 for forming the exterior shape of the connection portion 12 of the intermediate molded body 11 is provided. The distal end portions 34A of the projections 34 are formed in a shape of a flat surface having rounded edges, and also the distal end portions 34A are configured to abut against both end portions of the connection portions 12 of the preforms 10 inflated by blowing. In this way, the connection portion 12 including the welded surfaces of the preforms 10 is held in both directions by the pair of projections 34, so that the space, which allows the shape of the connection portion 12 to be freely deformed, is further decreased. Therefore, the connection portion 12 of the preforms 10 can be formed in a shape as designed. Further, when the preforms 10 are inflating, it is possible to prevent scratches from being generated on the connection portion 12 even if the inflating preforms 10 and the rounded and flat distal end portions 34A of the projections 34 come in contact with each other.

Further, in the intermediate molded body mold 31, a temperature of the inner wall surface including the projections 34 abutting against both end portions of the connection portion 12 during blowing is adjusted to a temperature (70 to 100° C.), which does not cause a temperature of the connection portion 12 to be decreased, by adjusting a temperature of the temperature adjusting portion 33. Therefore, it is possible to prevent the temperature of the connection portion 12 from being decreased due to contact with the inner wall surface including the projections 34.

Further, since the intermediate molded body 11, which has a straight shape formed as described above and a high bonding strength, is blow-molded in the final molded body mold 41, a connection portion 12 of a final molded body 13 to be finally manufactured can be also configured such that a shape thereof is difficult to be de formed and a high bonding strength is maintained.

Thus, according to the present embodiment, it is possible to prevent the connection portion of the multiple-chamber container from having a shape different from a shape as designed and also to enhance the bonding strength of the connection portion.

Also, the steps for manufacturing the multiple-chamber container, which is from manufacturing the preforms 10 until ejecting the final molded body 13, can be performed by one manufacturing device, thereby enhancing the efficiency in manufacturing the multiple-chamber container. Further, during the step of manufacturing the intermediate molded body 11, a temperature of the intermediate molded body 11 can be concurrently adjusted, so that a temperature of the intermediate molded body 11 can be adjusted in advance to a temperature suitable to treat the intermediate molded body 11 in the next step, thereby enhancing the efficiency in manufacturing the multiple-chamber container.

Meanwhile, the present invention is not limited to the foregoing embodiments, and thus appropriate changes, modifications and the like may be freely made thereto. In addition, the material, shape, dimension, numerical value, form, number, arrangement location and the like of each component of the foregoing embodiments are arbitrary and not limited, as long as the present invention can be achieved.

For example, a manufacturer manufacturing the intermediate molded body 11 and a manufacturer manufacturing the final molded body 13 may be different from each other. In this case, the manufacturer manufacturing the intermediate molded body 11 implements an example of the present invention. A manufacturing device for manufacturing the intermediate molded body 11 is sufficient if at least the preform manufacturing part 2 and the intermediate molded body manufacturing part 3 are equipped therein. A method for manufacturing the intermediate molded body 11 is sufficient if at least the steps of the first and second stages as described above are included therein.

Although the present invention has been described in detail with reference to the specific embodiments, it will be apparent to those skilled in the art that various changes or modifications can be made without departing from the spirit and scope of the present invention.

This application is based on Japanese Patent Application No. 2015-191100 filed on Sep. 29, 2015, the entire contents of which are incorporated herein by reference.

REFERENCE NUMERALS LIST

1: Manufacturing device for a multiple-chamber container
10: Preform
11: Intermediate molded body
12: Connection portion
13: Final molded body
21: Preform manufacturing unit
31: Intermediate molded body mold (an example of the first mold)
32: intermediate molded body blowing unit (an example of the first blowing unit)
33: Temperature adjusting portion
34: Projection
34A: Distal end portion
41: Final molded body mold (an example of the second mold)
42: Final molded body blowing unit (an example of the second blowing unit)
S1: First accommodating space
S2: Second accommodating space

The invention claimed is:

1. A manufacturing device for a multi-chamber container, the manufacturing device comprising:
   a first mold having a first accommodating space capable of accommodating a plurality of preforms, each preform having a mouth portion and a trunk portion;
   a first blowing unit configured to start blowing gas into the plurality of preforms in a state where the plurality of preforms are arranged in the first accommodating space in a manner such that truck portions of the plurality of preforms are arranged with only a space provided between the trunk portions, and configured to inflate the plurality of preforms, thereby manufacturing an intermediate molded body;
   a second mold having a second accommodating space larger than the first accommodating space; and
   a second blowing unit configured to blow gas into the intermediate molded body arranged in the second accommodating space to inflate the intermediate molded body, thereby forming an exterior shape of the multiple-chamber container,
   wherein a projection formed on an inner wall surface of the first mold is configured to form a connection portion, the connection portion corresponding to a portion of an exterior shape of the intermediate molded body that includes portions of the trunk portions of the plurality of preforms that are welded to each other, and
   wherein the connection portion of the multiple-chamber container has a non-uniform thickness that is widest at a central portion thereof and becomes more narrow toward peripheral portions thereof.

2. The manufacturing device according to claim 1, wherein a distal end of the projection includes a flat surface.

3. The manufacturing device according to claim 1, further comprising:
   a preform manufacturing unit configured to manufacture the preforms by injection molding; and
   an ejecting unit configured to eject the multiple-chamber container manufactured by the second blowing unit to an outside of the device.

4. The manufacturing device according to claim 1, wherein the first blowing unit includes a temperature adjusting portion configured to adjust a temperature of the intermediate molded body to a temperature at which resin can be easily inflated.

5. A method for manufacturing a multiple-chamber container by using a first mold having a first accommodating space and a second mold having a second accommodating space larger than the first accommodating space, the method comprising:
   preparing a plurality of preforms, each preform being made of resin and having a mouth portion and a trunk portion;
   manufacturing an intermediate molded body by arranging the plurality of preforms in the first accommodating space in a manner such that trunk portions of the plurality of preforms are arranged with only a space provided between the trunk portions and then starting to blow gas into the plurality of preforms to inflate the plurality of preforms; and
   forming an exterior shape of the multiple-chamber container by arranging the intermediate molded body in the second accommodating space and then blowing gas into the intermediate molded body to inflate the intermediate molded body,
   wherein the manufacturing the intermediate molded body further includes using a projection formed on an inner wall surface of the first mold to form a connection portion, the connection portion corresponding to a portion of an exterior shape of the intermediate molded body that includes portions of the trunk portions of the plurality of preforms that are welded to each other, and
   wherein the forming the exterior shape of the multiple-chamber container results in the connection portion having a non-uniform thickness that is widest at a central portion thereof and becomes more narrow toward peripheral portions thereof.

* * * * *